US011956216B2

(12) United States Patent
Tarighat

(10) Patent No.: US 11,956,216 B2
(45) Date of Patent: Apr. 9, 2024

(54) SECURITY SYSTEM FOR INDIVIDUALLY-OWNED ELECTRONIC DEVICES

(71) Applicant: AGENCY CYBER INC., New York, NY (US)

(72) Inventor: Amir Tarighat, New York, NY (US)

(73) Assignee: AGENCY CYBER INC., New York, NY (US)

( * ) Notice: Subject to any disclaimer, the term of this patent is extended or adjusted under 35 U.S.C. 154(b) by 341 days.

(21) Appl. No.: 17/647,618

(22) Filed: Jan. 11, 2022

(65) Prior Publication Data

US 2023/0224277 A1 Jul. 13, 2023

(51) Int. Cl.
*H04L 9/40* (2022.01)

(52) U.S. Cl.
CPC ...... *H04L 63/0272* (2013.01); *H04L 63/1425* (2013.01)

(58) Field of Classification Search
CPC .............. H04L 63/0272; H04L 63/1425
USPC .......................................................... 726/15
See application file for complete search history.

(56) References Cited

U.S. PATENT DOCUMENTS

| | | | | |
|---|---|---|---|---|
| 8,438,631 | B1* | 5/2013 | Taylor | H04W 12/068 726/15 |
| 8,448,238 | B1* | 5/2013 | Gupta | H04L 63/08 726/15 |
| 10,037,199 | B2* | 7/2018 | Hung | G06F 9/54 |
| 10,594,733 | B2* | 3/2020 | Feiertag | G06F 21/577 |
| 11,290,425 | B2* | 3/2022 | Newell | H04L 63/029 |
| 2009/0158302 | A1* | 6/2009 | Nicodemus | H04L 63/0272 726/6 |
| 2017/0346812 | A1* | 11/2017 | Newell | H04L 63/166 |
| 2018/0255158 | A1* | 9/2018 | Bradley | H04L 67/306 |
| 2019/0007447 | A1* | 1/2019 | Barnes | H04L 63/306 |
| 2019/0109864 | A1* | 4/2019 | Eren | H04W 12/12 |
| 2021/0144179 | A1* | 5/2021 | Grummons | H04L 12/4633 |
| 2022/0092539 | A1* | 3/2022 | Meriaz | G06Q 30/0643 |
| 2022/0103599 | A1* | 3/2022 | Zheng | G06F 9/45558 |

* cited by examiner

*Primary Examiner* — Amare F Tabor
(74) *Attorney, Agent, or Firm* — PATENT PORTFOLIO BUILDERS PLLC

(57) ABSTRACT

A security system for individually-owned electronic devices includes a network operations center with an enrollment system, device management system, network layer security system, personal information monitoring system, detection and response system, and monitoring and alert system. An individually-owned electronic device communicates with the network operations center in order to receive and install a configuration file and a security application, as well as to configure a virtual private network connection. These components operate independently and collectively to identify and address security threats to the individually-owned electronic devices.

17 Claims, 6 Drawing Sheets

SECURITY SYSTEM FOR INDIVIDUALLY-OWNED ELECTRONIC DEVICES

BACKGROUND

Technical Field

Embodiments of the disclosed subject matter generally relate to systems and methods for securing individually-owned electronic devices.

Discussion of the Background

The proliferation of malware, phishing, and other security threats have led many companies to implement security software for the devices they provide their employees. Specifically, corporate networks store a variety of data that must be protected from outside access, such as trade secrets, protected health information, and/or other information required to be protected governmental laws and/or regulations. Accordingly, companies typically install software on the devices they provide their employees that require the use of a corporate domain and/or user authentication, which protects data on the corporate network from unauthorized access.

Companies typically have information technology (IT) staff dedicated to protecting the corporate network and the devices they provide their employees or they employ a third-party service provider to protect the corporate network and the devices they provide their employees. The IT staff or third-party service provider typically employ a device management system (DMS) to provision each device the corporation provides to their employees with a particular company-wide device configuration profile, which defines that the device must use the corporate domain and/or user authentication.

Some companies also employ a security orchestration, automation, and response (SOAR) system to reduce the required information technology staffing because a SOAR system can manage threats and vulnerabilities, respond to security incidents, and automate security operations. Another solution employed by companies is a security information and event management (SIEM) system, which is a set of services and tools that allow information technology staff to collect and analyze security data, as well as create policies and design notifications. SOAR and SIEM systems require all enrolled devices to have common settings for their network, applications, device types, and identity management systems. For example, currently all major device management systems require unified identity management systems, such as Microsoft Active Directory or Okta, which are assigned by companies to employees. In addition to requiring common settings across the enrolled devices, these systems require the enrolled devices to operate in "Supervised" status, which means that the administrator, and not the user of the enrolled device, controls all settings of the enrolled device and the user of the enrolled device cannot remove or change the settings.

Although companies have the necessary resources to manage their networks and the devices they provide their employees, individuals typically have little knowledge of what is required to properly protect and secure their own devices. The most common way for individuals to protect their own devices is by installing anti-virus software on the device, which can scan for viruses using known virus signatures.

Although anti-virus software is mostly effective for addressing situations in which a device has already installed malware, zero-day threats can evade anti-virus software and therefore can compromise a device and the data stored on and/or accessible by the device. Further, anti-virus software typically is not able to prevent access to potentially malicious websites, prevent access to potentially malicious advertising networks, or protect against phishing operations. Anti-virus software also does not provide the fundamental elements of "enterprise level" security, such as forensic logging or aid in the rapid response and recovery in the event of an incident.

Thus, there is a need for a security system for securing and protecting individually-owned electronic devices. Further, there is a need for such a security system that provides the five functions of a cybersecurity framework as published by the National Institute of Standards and Technology (NIST), which include identify, protect, detect, respond, and recover from security incidents. Further, it is desirable for the security system to provide more comprehensive security compared to anti-virus software. More comprehensive security can better protect individually-owned electronic devices by preventing the downloading and/or installation of potential malware or otherwise accessing and/or modifying operating system or application settings of individually-owned electronic devices.

SUMMARY

According to embodiments there is a method, which involves receiving, by an enrollment system from a first user, a communication identifier for the first user, an identification of a device type of an individually-owned electronic device of the first user, and an identification of an operating system for the individually-owned electronic device of the first user. A device management system generates, using the received communication identifier, identification of the device type, and the identification of the operating system, a configuration file. The device management system transmits a message addressed to the communication identifier for the first user. The device management system receives from the individually-owned electronic device of the first user, a request to download the configuration file. The device management system transmits the configuration file to the individually-owned electronic device of the first user. The configuration file transmitted to the individually-owned electronic device of the first user is installed on the individually-owned electronic device of the first user, wherein, responsive to the installation of the configuration file, a security application is installed on the individually-owned electronic device of the first user and a virtual private network connection is configured for communications to and from the individually-owned electronic device of the first user.

According to embodiments there is a method, which involves a first user transmitting to an enrollment system a communication identifier for the first user, an identification of a device type of an individually-owned electronic device of the first user, and an identification of an operating system of the individually-owned electronic device of the first user. The individually-owned electronic device of the first user receives from a device management system, a message addressed to the communication identifier for the first user. The individually-owned electronic device transmits a request to download a configuration file to the device management system. The individually-owned electronic device receives the configuration file from the device management system. The individually-owned electronic device installs the received configuration file on the individually-owned electronic device. Responsive to the installation of the received configuration file, the individually-owned electronic device installs a security application on the individually-owned electronic device and a virtual private network connection is configured for communications to and from the individually-owned electronic device.

According to embodiments there is a system, which includes an individually-owned electronic device of a first user and a network operations center comprising an enrollment system and a device management system. The enrollment system is configured to receive from the first user, a communication identifier for the first user, an identification of a device type of the individually-owned electronic device of the first user, and an identification of an operating system for the individually-owned electronic device of the first user. The device management system is configured to generate, using the received communication identifier, identification of the device type, and the identification of the operating system, a configuration file; transmit a message addressed to the communication identifier for the first user; receive, from the individually-owned electronic device of the first user, a request to download the configuration file, and transmit the configuration file to the individually-owned electronic device of the first user. The individually-owned electronic device is configured to install the transmitted configuration file on the individually-owned electronic device of the first user, wherein, responsive to the installation of the configuration file, the individually-owned electronic device is configured to install a security application on the individually-owned electronic device of the first user and configure a virtual private network connection for communications to and from the individually-owned electronic device of the first user.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of individually-owned electronic devices. The electronic devices can be smart phones, tablets, laptops, and the like. Such electronic devices comprise at least a processor to perform the various disclosed functions, as well as one or more memories for storing the various information described below.

Exemplary embodiments provide a security system for individually-owned electronic devices. As used herein, individually-owned electronic devices are those devices that are not corporate- or enterprise-owned but instead are owned by private persons or purchased by a business but used as a personal device that does not operate on a corporate network. In one example, an individually-owned electronic device is owned by an individual working for a medical organization and coming into contact with sensitive private data. Although the person's individually-owned electronic device is not managed by a corporate network, it is still desirable to secure the electronic device because having the individually-owned electronic device in a medical environment increases the potential for attacks on the employer's network and data. The disclosed security system employs components individually, as well as together, to help protect and secure individually-owned electronic devices from a variety of security threats.

Figure 1:
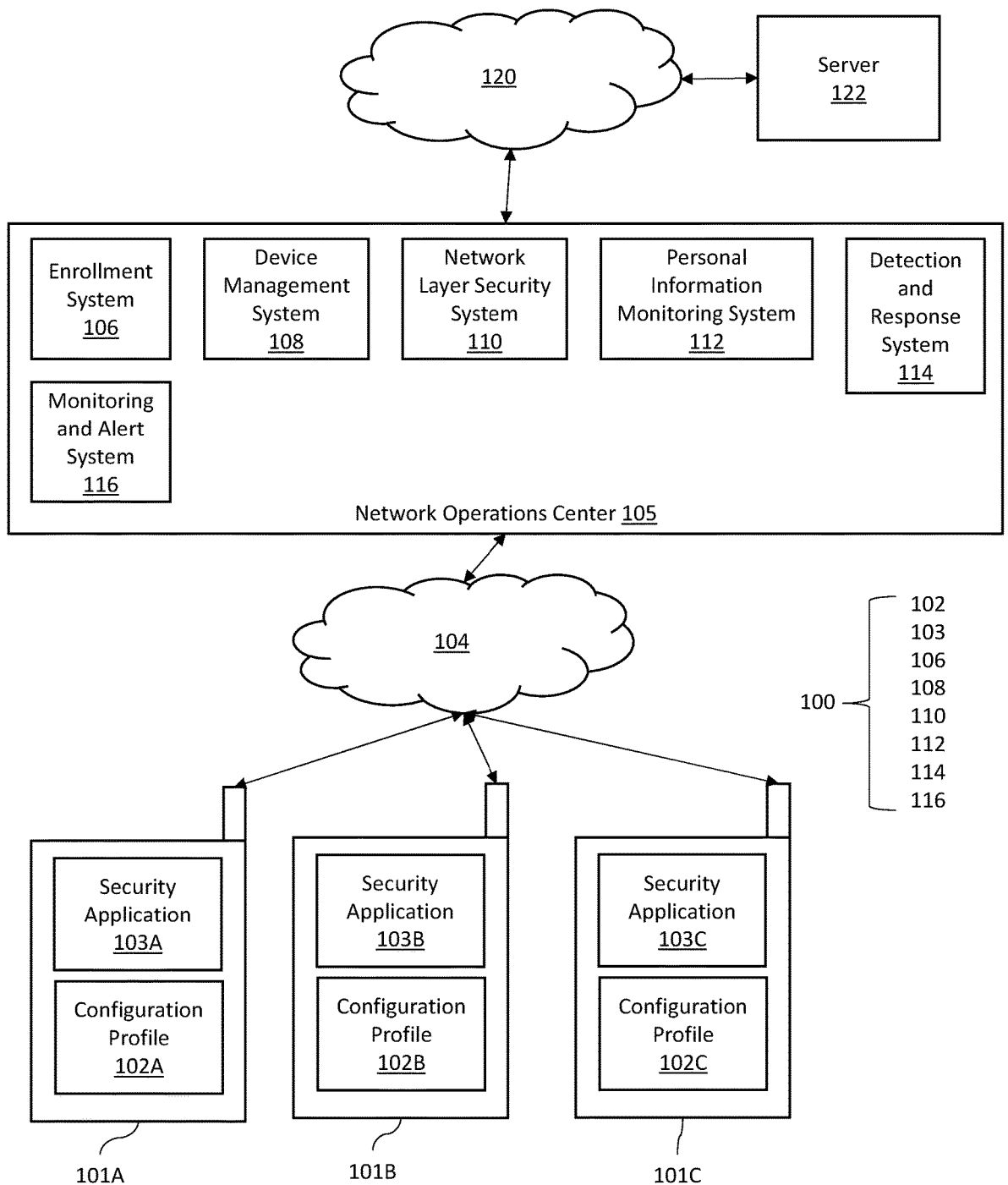
FIG. 1 is a block diagram of a system for securing individually-owned electronic devices according to embodiments.

FIG. 1 is a block diagram of a system for securing individually-owned electronic devices according to embodiments. As will be detailed below, the disclosed security system 100 comprises a configuration profile 102A-102C and a security application 103A-103C installed on a respective individually-owned electronic device 101A-101C, a virtual private network (VPN) connection configured on a respective individually-owned electronic device 101A-101C, as well as the systems 106-116 of the network operations center (NOC) 105. Although only three individually-owned electronic devices are illustrated, the system can include more or fewer than three individually-owned electronic devices.

The configuration profile 102A-102C defines a variety of parameters controlling which functions of the individually-owned electronic device 101A-101C are accessible by the user. For example, the configuration profile 102A-102C can define the applications that can be installed on the individually-owned electronic device 101A-101C, the operating system access allowed by applications installed on the individually-owned electronic device 101A-101C, the websites allowed and not allowed to be accessed by applications installed on the individually-owned electronic device 101A-101C, and the like. As will be recognized by those skilled in the art, the aforementioned parameters are merely examples and configuration profiles can define additional and/or different parameters for controlling the operation of the individually-owned electronic devices 101A-101C.

The security application 103A-103C utilizes both local software on the individually-owned electronic device and cloud-based software to secure the operation system and installed applications on the individually-owned electronic device. The security application 103A-103C is configured to detect vulnerabilities of varying types and actively intervene, which includes malware and virus detection, as well as monitoring the operating system and installed applications. The security application 103A-103C also uses machine learning and artificial intelligence to adapt its tactics and detections on a user level, system level, and global level, and also reports its findings and any identified events to the detection and response system 114.

The security application 103A-103C can also protect against threats caused by sideloaded applications. For example, an application installed on an individually-owned electronic device that did not originate from a known or approved application store is a potentially high severity security event. Depending upon use case, the individually-owned electronic devices are blocked from downloading and sideloading applications and the user can be notified. If the user did not intentionally install a third party or sideloaded application, immediate action can be taken to remediate the threat, including removing the application and analyzing logs and meta data to determine where or how the application was installed.

The individually-owned electronic devices 101A-101C are configured to employ a VPN connection for all TCP/IP traffic, the VPN connection terminating at the network operations center 105. Specifically, the VPN connection secures communications from the individually-owned electronic devices 101A-101C through a network 104 to the network operations center 105. As will be described in more detail below, terminating the VPN connection at the network operations center 105 allows the systems of the network operation center to monitor communications to/from the individually-owned electronic devices 101A-101C and take remedial action, if necessary. Network 104 can include a wireless communication network (including a short-range wireless communication network that uses Wi-Fi, Bluetooth, or the like, as well as a long-range wireless communication network that uses 3G, 4G, 5G, etc. wireless communication technology), as well as one or more wired communication networks, such as the Internet and/or a backbone wired network of a communication provider.

The network operations center 105 includes an enrollment system 106, a device management system 108, a network layer security system 110, a personal information monitoring system 112, a detection and response system 114, and a monitoring and alert system 116. Systems 106-116 can be implemented as separate servers or on a common server, with each system executing software to perform the functions described in more detail below.

The enrollment system 106 is configured to handle sign-up and registration for the service provided by the security system 100, as well as provisioning the individually-owned electronic devices 101A-101C and users. The enrollment system 106 provides a direct interface for users to receive information regarding the status of their individually-owned electronic devices 101A-101C. The enrollment system 106 is accessible to users through the internet as an internet portal or application, as well as standalone software on mobile electronic devices or desktops. Here it is noted that typical cybersecurity systems do not have a self-service component and require administrative approval, control, and provisioning of electronic devices and users. In a typical cybersecurity system, the administrator or manager of the corporate network signs up for the service, and then individually assigns and controls each end user. The end-user cannot choose any of the settings, add or select which electronic devices are managed or how the electronic devices are managed. Instead, the system administrator has total control of the device settings, including the ability to wipe the device, locate it, or view any data on the device which the end-user may view as private.

The device management system 108 provisions users and individually-owned electronic devices 101A-101C, manages all aspects of the electronic device configuration, and controls the installation and status of the disclosed security protocols and local software on the individually-owned electronic device. The device management system 108 also serves as a monitoring system that generates alerts for administrators and users when security-related incidents are detected. If required, device management system 108 can also aid in locking the device, wiping data, physically locating, or other similar interventions at the user's discretion.

The network layer security system 110 also is configured to handle phishing threats using a combination of domain name system (DNS) data, internet protocol (IP) data, application data, and metadata to determine if the destination or origin of a connection, such as a malicious link in an email, is being used for phishing. The network layer security system 110 uses both known databases of connections as well as machine learning to determine if a connection is likely to be malicious. When a phishing connection is detected, the user is blocked from opening the link, displaying the website, or transmitting data; even if the connection is not made directly by the user and instead by an application. The detection and response system 114 logs all such encounters and the user is notified about what occurred.

The network layer security system 110 encrypts all user network traffic through cellular, Wi-Fi, or wired internet connections using the VPN connection with the individually-owned electronic devices 101A-101C. The network layer security system 110 also analyzes traffic metadata along with other device and application-level data for threats and actively intervenes to protect the user. An example of this would be a social media application on an individually-owned electronic device attempting to send some data or file to a server not associated with that application or in a foreign country not normally associated with that application or electronic device (e.g., the user and/or the individually-owned electronic device has not previously contacted a server located in the foreign country in which the server that the social media application is currently attempting to contact is also located). The network layer security system 110 is thus able to both detect and log this event happening and would also actively intervene to prevent it from happening.

The network layer security system 110 can also identify and address man-in-the-middle attacks arising in compromised Wi-Fi and/or cellular network. Man-in-the-middle attacks can occur on both secured and unsecured Wi-Fi networks and in cellular connections and the threats can originate from the operator of the network router or even the service provider (this may occur intentionally by the provider or unintentionally due to a compromised system). Using a VPN connection between the individually-owned electronic devices 101A-101C and the network layer security system 110 provides some protection to such attacks because the data is encrypted over the VPN connection. Because encrypted traffic can still be intercepted and used in various ways to compromise the user, the network layer security system 110 also detects interference with the VPN connection, such as eavesdropping or packet interception, using several methods, including tamper detection by examining the latency of packets transmitted through the network connections of the device through the encapsulated network tunnel. For example, a non-trivial computation, such as a hash function, can be transmitted from one or more of the individually-owned electronic devices 101A-101C to the network layer security system 110, which then checks for discrepancies in the expected latency and response time of the transmission through the VPN connection. Although the traffic remains securely encrypted, a potential attacker could still derive some benefit from intercepting the encapsulated information, and therefore the network layer security system 110 can determine the possibility of a compromised communication connection and can and use the monitoring and alert system 116 to notify affected users to disconnect from that network. Further the network layer security system 110 reports all forensic event data to the detection and response system 114, which then analyzes the data in the report to determine if an attack occurred and the source of the attack, as well as use the data in the report at a latter point in time if a larger scale attacked occurred (not necessarily directed at a single user) to determine the enrolled individually-owned electronic devices exposed to such a breach.

The network layer security system 110 is also configured to handle phishing threats using a combination of domain name system (DNS) data, internet protocol (IP) data, application data, and metadata to determine if the destination or origin of a connection, such as a malicious link in an email, is being used for phishing. The network layer security system 110 uses both known databases of connections as well as machine learning to determine if a connection is likely to be malicious. When a phishing connection is detected, the user is blocked from opening the link, displaying the website, or transmitting data; even if the connection is not made directly by the user and instead by an application. The detection response system 114 logs all such encounters and the user is notified about what occurred.

Further, the network layer security system 110 detects data leaks and blocks them from transmitting, and notifies the user. This is achieved using data provided by the security application 103A-103C installed on an individually-owned electronic device 101A-101C as to the application sending the leaked data and/or by identifying data being transmitted to a known or suspected malicious server. In the event that the user intended the transmission or the transmission has a defined use, the user can inform the network layer security system 110 of this so that the network layer security system 110 allows the transmission to continue.

The network layer security system 110 also detects connections to malicious websites by analyzing known databases of such sites and machine learning to detect similar potential threats. The user's individually-owned electronic device is blocked from accessing these websites and the user is notified that they are attempting to connect to a malicious website. The user and monitoring staff are also notified when the connection to the malicious website was not made by the user but rather by some other application or malware. This can be detected by the security application 103A-103C and/or the network layer security system 110 working individually to detect and block such connections. This can also involve detecting connections and transmissions from applications or websites of malicious activity from online advertising networks, the malicious activity including transmitting private identification information, adware, or malicious advertising. This causes privacy issues and serves to annoy, harass, or slow down the user device or connection. The network layer security system 110 blocks any incoming or outgoing transmission of data with online advertising networks identified as being associated with malicious activity but the user is allowed to continue to use a website or application (so long as it is not malicious) but blocks the advertising network.

Thus, as will be described in more detail below, the security system 100 configures the individually-owned electronic devices 101A-101C to employ a virtual private network (VPN) communication connection for all TCP/IP traffic, where the VPN tunnel terminates in the network operations center 105, which encrypts all network traffic between the individually-owned electronic devices 110A-110C and the network operations center 105. The network operations center 105 then transmits the TCP/IP traffic over network 120 to a server 122 identified in the TCP/IP traffic. This allows, for example, the network layer security system 110 to monitor the metadata of traffic originating from or terminating at one or more of the individually-owned electronic devices 101A-101C and take action should the metadata indicate that there is a security risk associated with the communication, such as one of the individually-owned electronic devices 101A-101C sending a request to a server 122 that is known to be associated with malware threats and/or phishing attempts.

The VPN connection also allows the network layer security system 110 to protect the individually-owned electronic devices from attacks through SMS messages, e-mail, and other messaging application. Specifically, the network layer security system 110 can mitigate these threats before they arrive or are able to attack the individually-owned electronic device using the same techniques described herein with respect to other types of attacks by blocking and logging any link or file transmitted to, from, or attempting to connect to a malicious server. Thus, data in an SMS message, e-mail, and/or communication using a messaging application can be identified as an anomaly that can compromise the security of the individually-owned electronic device. Further, the user is notified of the blocking. In the unlikely event that a threat gets past the network layer security system 110, the security system 100 is able to detect and remediate threats through the other components, such as the security application 103A-103C installed on the individually-owned electronic device performing signature-based scans and operating system monitoring for privilege escalation, overriding, or side-loaded applications.

The personal information monitoring system 112 monitors the internet and the dark web to identify whether a user's credentials to websites, accounts, and applications they use online have been compromised. The personal information monitoring system 112 checks for compromised accounts on the internet and dark web, known breaches, and other techniques to identify user information that has been compromised and notifies the user of the compromised information and instructs the user to change their compromised credentials. The personal information monitoring system 112 also includes a password management system to help organize, change, and generate secure passwords, such as new secure passwords for those that have been compromised.

The detection and response system 114 performs security orchestration for the security system 100 by logging and analyzing all security data captured from different components of the system, including the security application 103A-103C installed on the individually-owned electronic devices 101A-101C and the network layer security system 110. The logs and analysis allow monitoring staff to research security events and use it to remediate any issues for a single individually-owned electronic device or a number of individually-owned electronic devices enrolled with the security system 100. For example, if the network layer security system 110 detects a file being downloaded and blocks the downloading because the file is malicious, the detection and response system 114 logs this notification. If this occurs multiple times to the same user or to different users, a response is triggered by the detection and response system 114. In this situation the response can involve blocking access to the website hosting the malicious file for all individually-owned electronic devices 101A-101C enrolled with the security system 100. Alternatively, or additionally, the detection and response system can contact the user to determine whether the user has instigated the multiple attempts to download the malicious file or whether the user is being targeted for a security exploit.

In another example, the detection and response system 114 can address known application vulnerabilities. If, for example, there is a known vulnerability in a particular internet browser, the detection and response system 114 can coordinate the automatic updating of the internet browser on the individually-owned electronic devices 101A-101C to a version that does not have the vulnerability. Until the browser has been updated, the detection and response system 114 can notify the network layer security system 110 to block any traffic or activity originating from individually-owned electronic devices 101A-101C that are running the version of the internet browser that has the vulnerability. The detection and response system 114 can identify the affected individually-owned electronic devices 101A-101C using information stored in the device management system 108 regarding the currently installed version of the internet browser on each individually-owned electronic devices 101A-101C enrolled with the security system. Thus, the detection and response system 114 can be employed to identify a specific signature (application or malware) on a per-user, group and/or all enrolled electronic device basis, update all versions of an application on a particular day, ensure that the applications on each of the enrolled individually-owned electronic devices 101A-101C are running correctly, as well as blocking access to particular website(s) and/or application(s) for all enrolled individually-owned electronic devices 101A-101C.

The detection and response system 114 also provides forensic evidence in the event of a compromise. The detection and response system 114 analyzes the data using various techniques from data science, statistical, geographical, and machine learning. Typical event detection response systems are designed for protecting applications on servers or for corporate networks as a whole. In contrast, the disclosed detection and response system 114 is specifically configured for protecting individually-owned electronic devices.

The monitoring and alert system 116 allows monitoring staff to access device and system information to actively monitor and intervene in security events. This facilitates granular analysis of security data and the generation of alerts to aid in the monitoring capacity. The monitoring and alert system 116 provides detailed information about users and individually-owned electronic devices so that monitoring staff can contact users and address emergent or active threats in a timely manner. This provides the ability for a 24/7 security operations center tailored specifically for security monitoring of individually-owned electronic devices 101A-101C. The monitoring and alert system 116 enables monitoring staff to communicate with users, authenticate users, take remedial actions, and provide all levels of security information technology support. The monitoring and alert system 116 also enables security monitoring of the entire security system 100 in conjunction with other applications designed to harden and secure the other components of the security system 100.

Although aspects of the security system 100 are discussed individually to highlight the functionality of different components, the various components of the security system 100 also operate together to address threats to individually-owned electronic devices. For example, vulnerabilities of the operating system are detected using the security application 103A-103C installed on the individually-owned electronic device, the configuration profile 102A-102C installed on the individually-owned electronic device, and the detection and response system 114. Specifically, the security system 100 detects vulnerabilities caused by the operating system of the individually-owned electronic device 101A-101C such as improper configuration or changes to configuration profile 102A-102Cs, elevation of privileges, out of date components, exposure of sensitive information, memory corruption, overflow or overwriting exploits, and denial of service among others. In order to do so, the detection and response system 114 analyzes data retrieved from the device to detect security events, which are analyzed and categorized by severity. Depending on the user preference and use case, the detection and response system 114 alerts the user and monitoring staff with detailed information about the identified threat. Depending on the type of threat, the system can automatically block, remove, or sandbox the threat. In other cases, the user or staff can remediate the threat by updating the operating system, changing a setting, or removing some file or application. In more severe cases, the detection and response system 114 can remotely wipe the device. Finally, if the threat is connecting to an external server, as in a command and control exploit, the detection and response system 114 will automatically block that connection using the network layer security system 110, which renders the threat powerless.

Various components of the system also are used to detect malware and viruses in two separate ways. First, the security application 103A-103C installed on the individually-owned electronic devices 101A-101C performs signature-based scans of the individually-owned electronic device and the installed applications so that the contents of the individually-owned electronic device are searched continuously for known viruses or malware and files that resemble known malware. Further, the network layer security system 110 monitors network level connections, such as TCP/IP, for applications on the device that connect to risky or suspicious external servers. If network layer security system 110 detects such a connection, the network layer security system 110 immediately blocks the connection with the particular individually-owned electronic device. An example of this would be a free application with fonts downloaded from an App Store, which attempts to open connections to servers that may be known to be malicious or improper. Once detected, additional actions can be taken, such as deleting the application. The network layer security system 110 can also add the application to a blacklist that prevents other individually-owned electronic devices from being able to download the application, thereby leveraging the information from one individually-owned electronic device across all of the individually-owned electronic devices enrolled with the security system 100.

Further, the security system 100 can use public information and information obtained from the metadata collected by the security system 100 to determine the risk profile of third party applications. Users and monitoring staff are notified of attempts to install applications that may be a heightened security risk. Depending on user preferences and use case the applications maybe blocked from installing or downloading all together The security system 100 can use the security application 103A-103C installed on the individually-owned electronic device 101A-101C in conjunction with the network layer security system 110 to address zero-day threats or exploits, which are a class of threat that are unknown or occur when a weakness in the operating system or one of the installed applications is not addressed. Zero-day threats or exploits can originate in the operating system, in any application, or in malware. Because the exploit is unknown, the detection and response system 114 uses machine leaning and analysis of metadata from the individually-owned electronic devices 101A-101C, network captured via the virtual private network, and applications to determine potential threats from unexpected behavior. An example of unexpected behavior would be connections to servers that the device (and/or the user of the device) do not normally connect to, transmission of data in a potential harmful manner, detections of changes in privileges in the operating system, or sideloaded applications. The security application 103A-103C on the individually-owned electronic devices 101A-101C collect performance data of the electronic devices to analyze memory, computational power, and/or energy usage that can be indicative of an unexpected or potential harmful threat. The security system 100 deals with zero-day threat first by the monitoring and alert system 116 logging and analyzing their potential behavior, and alerting monitoring staff of their possible existence. Secondly, the exploit in most circumstances will need to use a network connection or affect the operating system, which can be addressed by the security application 103A-103C and/or the network layer security system 110 detecting and stopping those things from happening regardless of whether they occur by a known or unknown exploit. In other words, how the threat made the malicious network connection may be unknown but the connection through the network layer is stopped nonetheless by the security application 103A-103C and/or the network layer security system 110.

Additional details of the operation of the security system 100 will now be described in connection with FIGS. 2A-5.

Figure 2A:
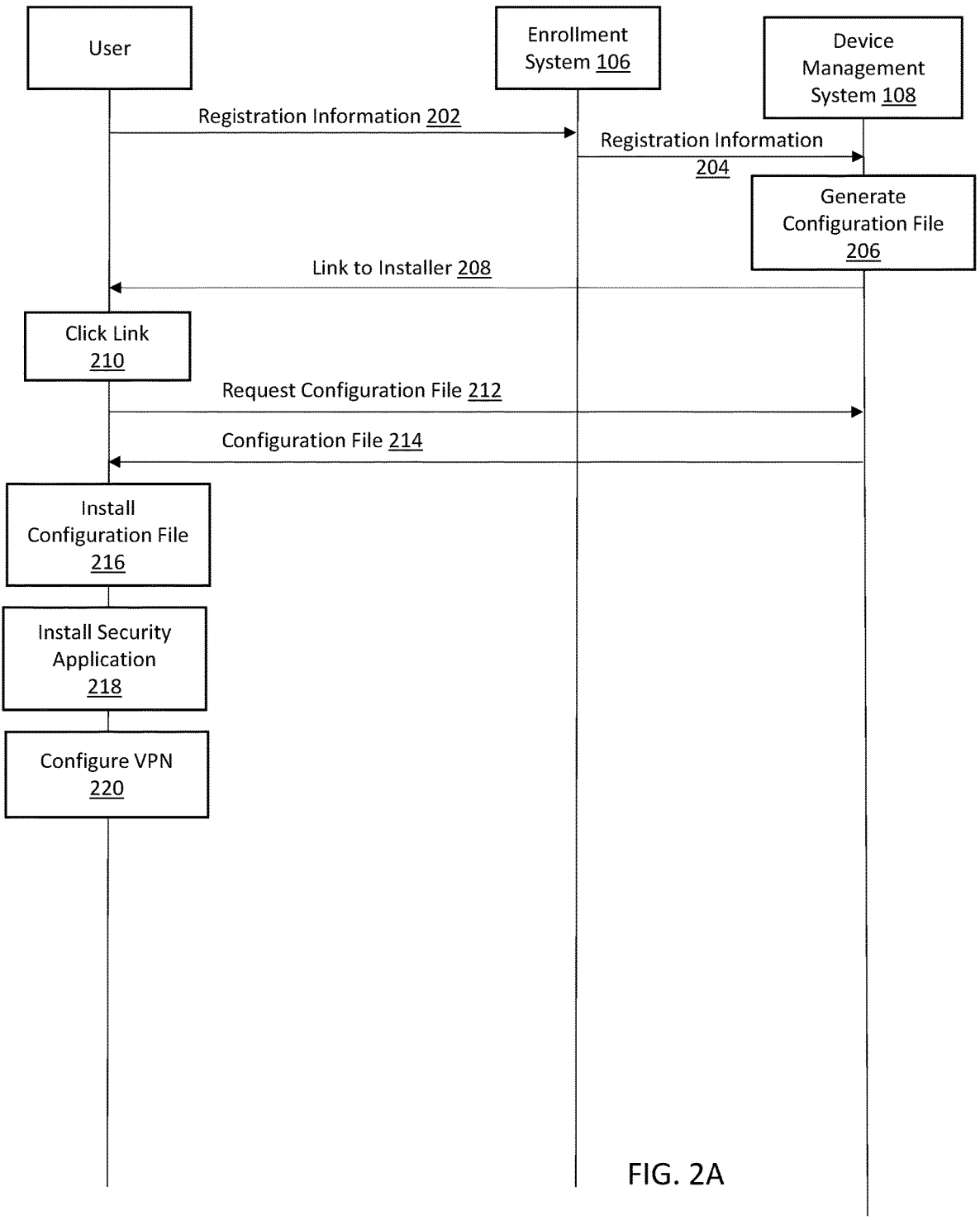
FIG. 2A is a call flow diagram of a method for enrolling an individually-owned electronic device with the security system according to embodiments.
Figure 2B:
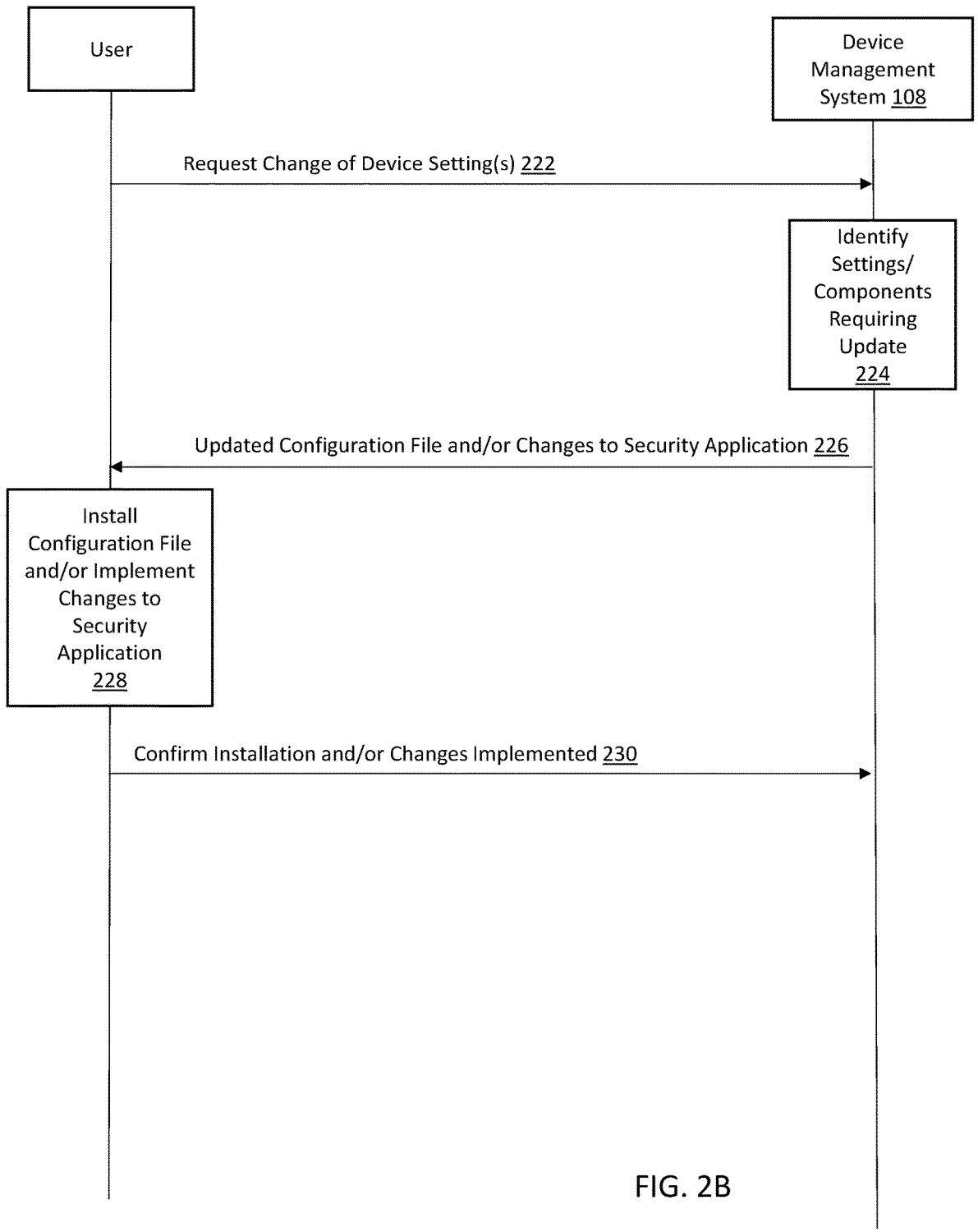
FIG. 2B is a call flow diagram of a method for user configuration of the security of their individually-owned electronic device according to embodiments.
Figure 3:
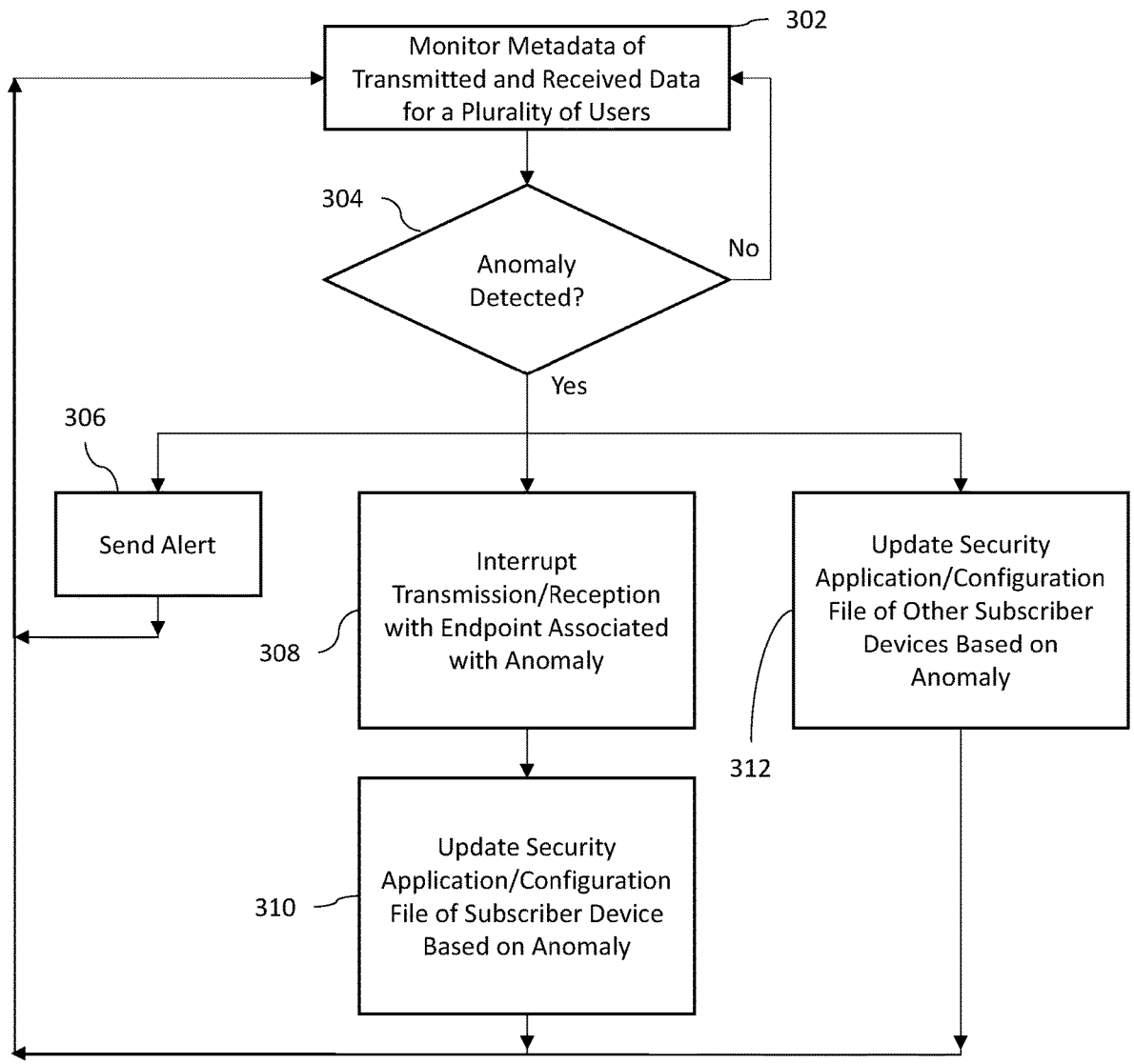
FIG. 3 is a flow diagram of method for providing network layer security monitoring according to embodiments.
Figure 4:
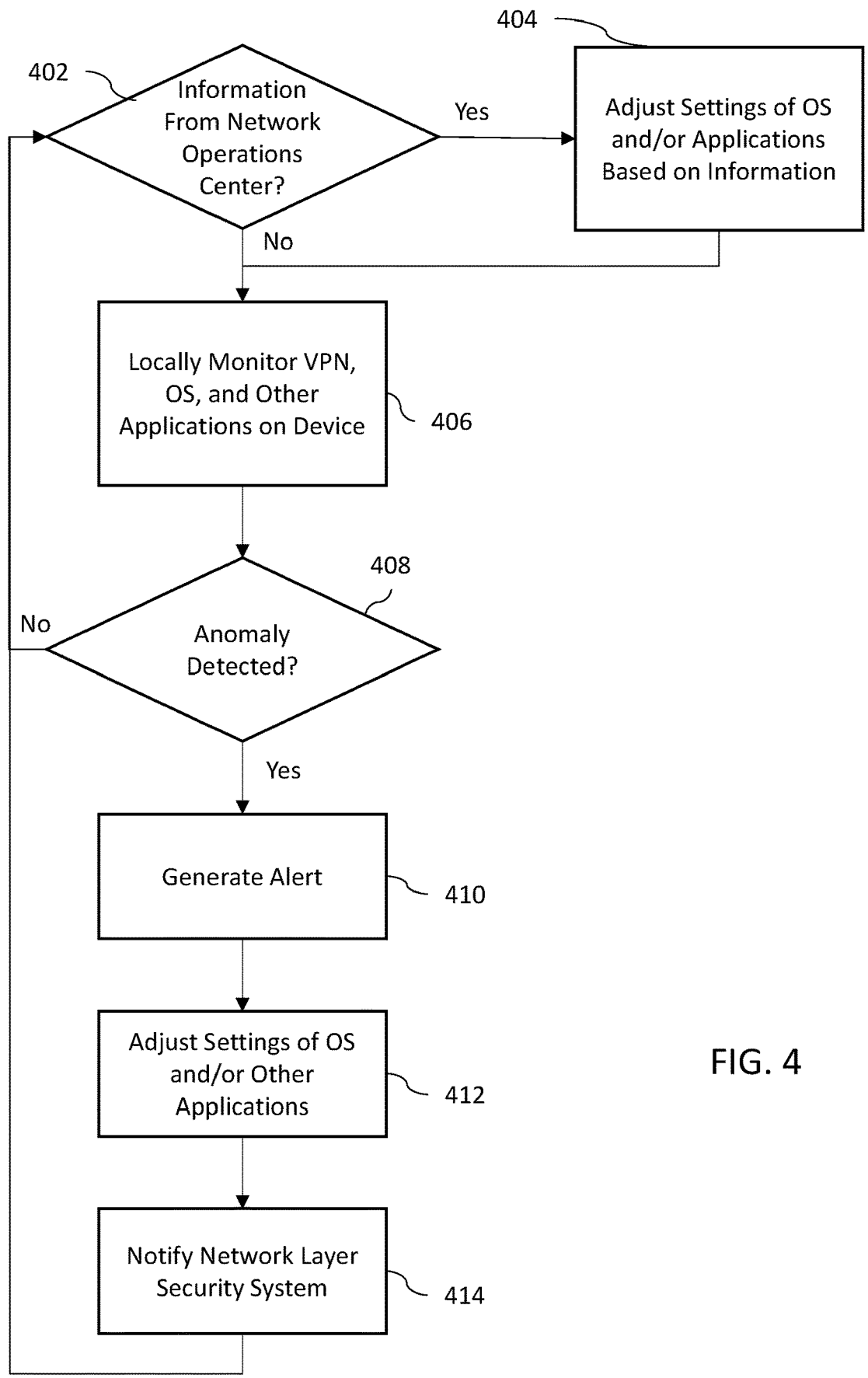
FIG. 4 is a flow diagram of a method for an application executing on an individually-owned device according to embodiments.
Figure 5:
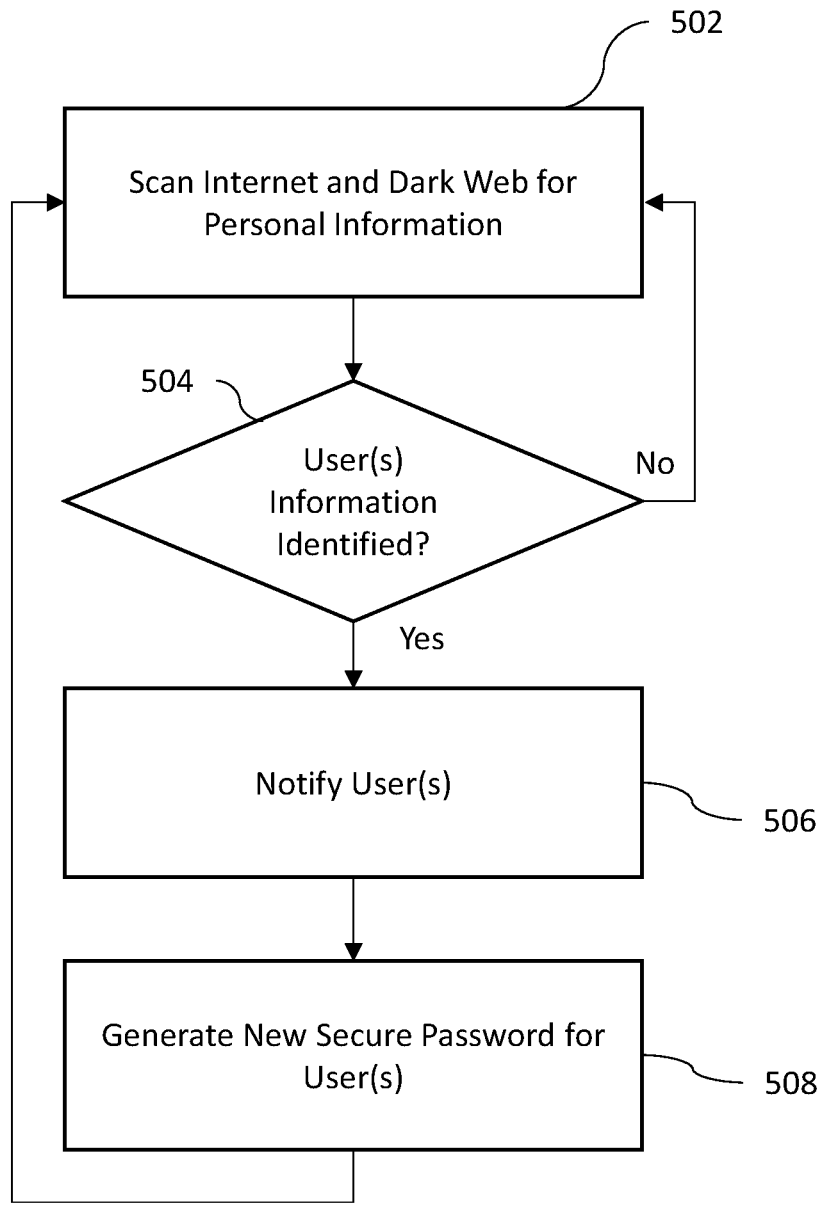
FIG. 5 is a flow diagram of a method for a web credential protection system according to embodiments.

FIG. 2A is a call flow diagram of a method for enrolling an individually-owned electronic device with the security system 100 according to embodiments. Initially, a user transmits registration information to the enrollment system 106 (step 202). The registration information can include, for example, a communication identifier for the first user (i.e., an address or telephone number associated with the individually-owned electronic device being enrolled with the security system 100), an identification of a device type of a device of the first user (e.g., make and model of the individually-owned electronic device), and an identification of an operating system for the device of the first user (e.g., the operation system type and version). The user can transmit the registration request using the individually-owned electronic device that is being enrolled with the security system 100 or another electronic device, such as a desktop computer. Additionally, although the enrollment is being described in connection with a user enrolling a single individually-owned electronic device, a user can enroll more than one individually-owned electronic device with the security system 100, in which case the user can manage the multiple individually-owned electronic devices individually or collectively.

The enrollment system 106 receives the registration information and forwards the information to the device management system 108 (step 204). The device management system generates a configuration file for the individually-owned electronic device being enrolled and transmits a link to an installer to the user's individually-owned electronic device (step 208). The installer link is addressed to the communication identifier provided with the registration information.

When the user clicks the installer link (step 210) on the individually-owned electronic device being enrolled, the individually-owned electronic device transmits a request for the configuration file to the device management system 108 (step 212), which responds by transmitting the generated configuration file to the user's individually-owned electronic device being enrolled (step 214). The individually-owned electronic device being enrolled installs the configuration file on the electronic device (step 216), installs a security application (step 218), and configures the VPN connection that terminates at the network operations center 105 (step 220). Accordingly, the user's individually-owned electronic device is now protected by the security system 100, details of the protection being addressed below in connection with FIGS. 3-5.

One problem with electronic devices configured on a company-wide basis is that the company defines the settings for the electronic device and the user has no ability to change or otherwise adjust the settings. In contrast, the disclosed security system 100 provides for user modification of the settings on the individually-owned electronic device. An exemplary method for user configuration of the security of their individually-owned electronic device according to embodiments will now be described in connection with FIG. 2B. Initially, the user transmits a request to change settings of the individually-owned electronic device to the device management system 108 (step 222). The request can be sent from the individually-owned electronic device that is enrolled in the security system 100 or another electronic device. In either case, an authentication and authorization of the user and/or the request can be performed (not shown in detail) to avoid malicious attempts to change the device settings.

The device management system 108 identifies the settings and/or software components requiring an update based on the change request in order to generate an updated configuration file and/or a message with the settings and/or software components requiring an update (step 224). The updated configuration file and/or the message with the settings and/or software components requiring an update are transmitted by the device management system 108 to the user's individually-owned electronic device (step 226), which installs the updated configuration file and/or implements the changes to the security application installed on the user's individually-owned electronic device (step 228). The user's individually-owned electronic device then transmits a confirmation that the changes have been implemented on the user's individually-owned electronic device to the device management system 108 (step 230), which can then update its database to reflect the updated configuration of the user's individually-owned electronic device. Thus, the device management system 108 transmits the data describing the change to the security of the individually-owned electronic device based only on receipt of the request to change the security from the first user and does not require additional approval from a network administrator, as is required in conventional corporate-based security systems.

As mentioned above, the user's individually-owned electronic device is configured by the security system 100 to employ a VPN connection for TCP/IP traffic, with the VPN tunnel terminating at the network operation center 105. The network layer security system 110 monitors metadata of the TCP/IP traffic (i.e., source and/or destination internet protocol (IP) address of message packets) transmitted to and received from the user's individually-owned electronic device. An exemplary method for the monitoring by the network layer security system 110 will now be described in connection with FIG. 3. The network layer security system 110 monitors metadata of the TCP/IP traffic transmitted to and received from the user's individually-owned electronic device (step 302) and determines whether there is an anomaly in the metadata (step 304). For example, the metadata may indicate that the user's individually-owned electronic device 101 is transmitting data to and/or receiving data from a server 122 that is known to be compromised or known to contain malicious code. When the network layer security system 110 detects an anomaly ("Yes" path out of decision step 304), the network layer security system 110 can take one or more actions. One action is the network layer security system 110 can send an alert to the user (directly to the user's individually-owned electronic device, e.g., via the operating system, and/or to an e-mail address, texting/ messaging address, and/or a telephone number) (step 306). Specifically, the network layer security system 110 uses the monitoring and alert system 116 to send the alert.

Additionally, or alternatively, the network layer security system 110 can interrupt the transmission and/or reception between the user's individually-owned electronic device with an endpoint associated with the anomaly, which in this example is server 122 (step 308). The network layer security system 110 is able to do this because it is the termination point of the VPN connection with the individually-owned electronic devices 101A-101C. The network layer security system 110 can then update the security application and/or the configuration file of the subscriber's individually-owned electronic device (step 310). For example, this update can involve including the IP address of the endpoint associated with the anomaly to a blacklist of IP addresses on the user's individually-owned electronic device, which prevents the user's individually-owned electronic device from accessing the server(s) associated with the IP address. Further, the IP address of the endpoint associated with the anomaly can be added to a blacklist of IP addresses stored by the detection and response system 114. Because there may be a reason why a user may want to access an endpoint associated with an anomaly, a user can use the method of FIG. 2B to adjust the configuration file and/or settings of the security application installed on the user's individually-owned electronic device to allow continued access to the endpoint associated with the anomaly.

Because the disclosed security system 100 is designed to support a number of individually-owned electronic devices, the network layer security system 110 can, additionally or alternatively to the actions above, update the security application and/or configuration file of individually-owned electronic devices that are enrolled with the security system 100 by other user's and/or other individually-owned electronic devices of the user.

As mentioned above in connection with the method of FIG. 2A, enrolling a user's individually-owned electronic device with the security system 100 causes the electronic device to install a security application. The security application can be configured to detect malware and other viruses, as well to locally monitor the VPN, the electronic device's operating system, as well as other applications on the electronic device. An exemplary method performed by the security application will now be described in connection with FIG. 4. The security application 103A-103C determines whether it has received information from the network operations center 105, such as from the device management system 108, the network layer security system 110, the personal information and monitoring system 112, the detection and response system 114, and/or the monitoring and alert system 116 (step 402). When the security application 103A-103C receives information from the network operations center 105 ("Yes" path out of decision step 402), the security application 103A-103C on the user's individually-owned electronic device 101A-101C adjusts settings of the electronic device's operating system and/or applications installed on the electronic device based on the information provided by the network operations center 105 (step 404).

If the security application 103A-103C has not received information from the network operations center 105 ("No" path out of decision step 402) or has adjusted the settings based on the information (step 404), the security application 103A-103C locally monitors the metadata of the VPN connection, the operating system, and other applications on the electronic device (step 406). Malware being installed on and/or executed by the user's individually-owned electronic device can be an anomaly. Another example of an anomaly is an application attempting to access functions of the operating system that are highly-secure functions, such as root level access. Yet another example of an anomaly is the transmission of data to and/or reception of data from an endpoint that is known to be compromised, such as an endpoint associated with an internet protocol address on a blacklist stored on or accessed by the user's individually-owned electronic device. If security application 103A-103C does not identify an anomaly in the metadata of the VPN connection, the operating system, or other applications on the electronic device ("No" path out of decision step 408), then the security application 103A-103C determines whether it has received information from the network operations center 105 (step 402).

When the user's individually-owned electronic device detects an anomaly ("Yes" path out of decision step 408), the security application 103A-103C can take one or more actions. One action is the security application sending an alert to the user (directly to the user's individually-owned electronic device, e.g., via the operating system, and/or to an e-mail address, texting/messaging address, and/or a telephone number) (step 410). Additionally, or alternatively, the security application 103A-103C can adjust settings of the operating system and/or other applications installed on the user's individually-owned electronic device based on the detected anomaly (step 412). Another action that can additionally, or alternatively, be performed by the security application 103A-103C is to notify the network layer security system 110 of the anomaly (step 414).

The network layer security system 110 and the security application 103A-103C installed on the user's individually-owned electronic device 101A-101C help protect data stored on or accessible by the user's individually-owned electronic device. However, the user's personal information may still be publicly-available on the internet or dark web. Accordingly, the security system 100 provides a personal information monitoring system 112, which scans the internet and dark web for the user's personal information. An exemplary method for a personal information monitoring system 112 will now be described in connection with FIG. 5.

The personal information monitoring system 112 scans the internet and dark web for the user's personal information (step 502). This scanning can be performed for the personal information of a number of users at the same time and can be accomplished using a web bot that crawls websites known to contain information obtained from compromised systems. If the scan uncovers the user's personal information ("Yes" path out decision step 504), the personal information monitoring system 112 notifies the user(s) that the information is posted on the internet and/or dark web (step 506), and in the case of a password breach, generates a new secure password for the user for the website associated with the password found on the internet and/or dark web (step 508).

As will be appreciated from the discussion above, the disclosed security system 100 utilizes novel methods to gain deep insight into device vulnerabilities leveraging data from other components of the system, like a per-app VPN which allows local software to receive and interpret data from other applications that typically would be inaccessible to local software, system wide data from malware and application threats, and tracking the IP addresses and DNS meta data applications on the device are using to detect threats on the network layer. It also incorporates known data breaches, databases of international threats, and online searches of the web to detect user private data such as compromised accounts.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The disclosed embodiments provide a security system for individually-owned electronic devices. It should be understood that this description is not intended to limit the invention. On the contrary, the exemplary embodiments are intended to cover alternatives, modifications, and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, comprising:
   receiving, by an enrollment system from a first user, a communication identifier for the first user, an identification of a device type of an individually-owned electronic device of the first user, and an identification of an operating system for the individually-owned electronic device of the first user;
   generating, by a device management system using the received communication identifier, identification of the device type, and the identification of the operating system, a configuration file;
   transmitting, by the device management system, a message addressed to the communication identifier for the first user;
   receiving, by the device management system from the individually-owned electronic device of the first user, a request to download the configuration file; and
   transmitting, by the device management system, the configuration file to the individually-owned electronic device of the first user,
   wherein the configuration file transmitted to the individually-owned electronic device of the first user is installed on the individually-owned electronic device of the first user, wherein, responsive to the installation of the configuration file, a security application is installed on the individually-owned electronic device of the first user and a virtual private network connection is configured for communications to and from the individually-owned electronic device of the first user,
   wherein the method further comprises:
   monitoring, by a network layer security system, metadata of data transmitted or received by the individually-owned electronic device over the virtual private network connection;
   detecting, based on the metadata, an anomaly in the data transmitted or received by the individually-owned electronic device over the virtual private network connection,
   wherein, responsive to the detection of the anomaly, the network layer security system
      sends an alert to the individually-owned electronic device;
      interrupts transmission or reception of the individually-owned electronic device with an endpoint associated with the anomaly; or
      notifies the security application installed on the individually-owned electronic device of the anomaly.

2. The method of claim 1, further comprising:
   receiving, by the enrollment system from the first user, a request to change security of the individually-owned electronic device;
   transmitting, by the device management system to the individually-owned electronic device, data describing the change to the security of the individually-owned electronic device,
   wherein the device management system transmits the data describing the change to the security of the individually-owned electronic device based only on receipt of the request to change the security of the device from the first user.

3. The method of claim 1, wherein the network layer security system sends the alert using a monitoring and alert system.

4. The method of claim 1, wherein the anomaly is detected in the data received by the individually-owned electronic device in an electronic mail over the virtual private network connection.

5. The method of claim 1, wherein the metadata includes a destination address of the endpoint associated with the anomaly.

6. The method of claim 1, wherein the anomaly is the transmission or reception of data to the endpoint in a location that is not associated with the individually-owned electronic device or the first user or that the endpoint is on a blacklist of compromised endpoints.

7. The method of claim 1, further comprising:
   determining whether the detected anomaly affects additional individually-owned electronic devices,
   wherein, responsive to determining that the detected anomaly affects additional individually-owned electronic devices, the network layer security system
      sends an alert to the additional individually-owned electronic devices;

interrupts transmission or reception of the additional individually-owned electronic devices with an endpoint associated with the anomaly; or notifies a security application installed on respective ones of the additional individually-owned electronic devices of the anomaly.

8. The method of claim 1, further comprising:

scanning, by a personal information monitoring system, the internet and dark web for personal information associated with the first user;

identifying, based on the scanning, personal information associated with the first user on the internet or on the dark web; and notifying the first user of the identified personal information.

9. The method of claim 8, wherein, responsive to identifying personal information associated with the first user on the internet or the dark web, the method further comprises:

identifying a website or application associated with the identified personal information; and generating, by the personal information monitoring system, new log-in credentials for the first user to access the identified website or identified application.

10. A method, comprising:

transmitting, from a first user to an enrollment system, a communication identifier for the first user, an identification of a device type of an individually-owned electronic device of the first user, and an identification of an operating system of the individually-owned electronic device of the first user;

receiving, by the individually-owned electronic device of the first user from a device management system, a message addressed to the communication identifier for the first user;

transmitting, by the individually-owned electronic device to the device management system, a request to download a configuration file;

receiving, by the individually-owned electronic device from the device management system, the configuration file; and installing, by the individually-owned electronic device on the individually-owned electronic device, the received configuration file, wherein, responsive to the installation of the received configuration file, the individually-owned electronic device installs a security application on the individually-owned electronic device and a virtual private network connection is configured for communications to and from the individually-owned electronic device, the method further comprising:

monitoring, by the security application installed on the individually-owned electronic device, data transmitted or received by an application being executed on the individually-owned electronic device;

detecting, based on the monitoring, an anomaly in the data transmitted or received by the application installed on the individually-owned electronic device, wherein, responsive to the detection of the anomaly, the security application outputs an alert on the individually-owned electronic device;

interrupts transmission or reception of the individually-owned electronic device with an endpoint associated with the anomaly; or analyzes the data transmitted or received by the application installed on the individually-owned electronic device and adjusts settings of the individually-owned electronic device or of the application being executed on the individually-owned electronic device.

11. The method of claim 10, further comprising:

sending, by the individually-owned electronic device to the enrollment system, a request to change security of the individually-owned electronic device;

receiving, by the individually-owned electronic device from the device management system, data describing the change to the security of the individually-owned electronic device; and updating, responsive to receipt of the data describing the change to the security of the individually-owned electronic device and based on the data describing the change to the security of the individually-owned electronic device, settings on the individually-owned electronic device.

12. The method of claim 10, wherein the anomaly is the transmission or reception of data to the endpoint in a location that is not associated with the individually-owned electronic device, the first user, and the application installed on the individually-owned electronic device.

13. The method of claim 10, wherein responsive to the detection of the anomaly, the security application analyzes the data transmitted or received by the application installed on the individually-owned electronic device and adjusts settings of the individually-owned electronic device or of the application being executed on the individually-owned electronic device, wherein the settings are adjusted to prevent the individually-owned electronic device from processing data received by the application associated with the detected anomaly.

14. A system, comprising:

an individually-owned electronic device of a first user; and a network operations center comprising an enrollment system and a device management system, wherein the enrollment system is configured to receive from the first user, a communication identifier for the first user, an identification of a device type of the individually-owned electronic device of the first user, and an identification of an operating system for the individually-owned electronic device of the first user, wherein the device management system is configured to generate, using the received communication identifier, identification of the device type, and the identification of the operating system, a configuration file, transmit a message addressed to the communication identifier for the first user, receive, from the individually-owned electronic device of the first user, a request to download the configuration file, and transmit the configuration file to the individually-owned electronic device of the first user, wherein the individually-owned electronic device is configured to install the transmitted configuration file on the individually-owned electronic device of the first user, wherein, responsive to the installation of the configuration file, the individually-owned electronic device is configured to install a security application on the individually-owned electronic device of the first user and configure a virtual private network connection for communications to and from the individually-owned electronic device of the first user, the system further comprising:

a network layer security system, which is configured to monitor metadata of data transmitted or received by the individually-owned electronic device over the virtual private network connection;

detect, based on the metadata, an anomaly in the data transmitted or received by the individually-owned electronic device over the virtual private network connection, wherein, responsive to the detection of the anomaly, the network layer security system is configured to send an alert to the individually-owned electronic device;

interrupt transmission or reception of the individually-owned electronic device with an endpoint associated with the anomaly; or notify the security application installed on the individually-owned electronic device of the anomaly.

15. The system of claim 14, wherein the enrollment system is configured to:

receive, from the first user, a request to change security of the individually-owned electronic device;

transmit, to the individually-owned electronic device, data describing the change to the security of the individually-owned electronic device, wherein the device management system is configured to transmit the data describing the change to the security of the individually-owned electronic device based only on receipt of the request to change the security of the device from the first user.

16. The system of claim 14, wherein the network operations center further comprises a monitoring and alert system configured to determine whether the detected anomaly affects additional individually-owned electronic devices, responsive to determining that the detected anomaly affects additional individually-owned electronic devices, the network layer security system is configured to send an alert to the additional individually-owned electronic devices;

interrupt transmission or reception of the additional individually-owned electronic devices with an endpoint associated with the anomaly; or notify a security application installed on respective ones of the additional individually-owned electronic devices of the anomaly.

17. The system of claim 14, wherein the security application installed on the individually-owned electronic device is configured to monitor data transmitted or received by an application being executed on the individually-owned electronic device;

detect, based on the monitoring, an anomaly in the data transmitted or received by the application installed on the individually-owned electronic device, wherein, responsive to the detection of the anomaly, the security application is configured to output an alert on the individually-owned electronic device;

interrupt transmission or reception of the individually-owned electronic device with an endpoint associated with the anomaly; or analyze the data transmitted or received by the application installed on the individually-owned electronic device and adjusts settings of the individually-owned electronic device or of the application being executed on the individually-owned electronic device.

* * * * *